(12) United States Patent
Sengchanh

(10) Patent No.: US 8,564,228 B2
(45) Date of Patent: Oct. 22, 2013

(54) ELECTRIC MACHINE

(76) Inventor: Chanty Sengchanh, Ngunnawal (AU)

( * ) Notice: Subject to any disclaimer, the term of this patent is extended or adjusted under 35 U.S.C. 154(b) by 327 days.

(21) Appl. No.: 13/128,634

(22) PCT Filed: Nov. 10, 2009

(86) PCT No.: PCT/AU2009/001457
§ 371 (c)(1),
(2), (4) Date: May 10, 2011

(87) PCT Pub. No.: WO2010/054425
PCT Pub. Date: May 20, 2010

(65) Prior Publication Data
US 2011/0210686 A1 Sep. 1, 2011

(30) Foreign Application Priority Data
Nov. 11, 2008 (AU) ................................. 2008905813

(51) Int. Cl.
*H02K 41/02* (2006.01)
*H02K 41/03* (2006.01)

(52) U.S. Cl.
CPC ...................................... *H02K 41/03* (2013.01)
USPC ......... 318/135; 318/495; 318/498; 310/12.25

(58) Field of Classification Search
CPC ...................................................... H02K 41/03
USPC ......... 318/135, 138, 498; 310/12.25, 216.071
See application file for complete search history.

(56) References Cited

U.S. PATENT DOCUMENTS

| | | | |
|---|---|---|---|
| 4,048,531 A | 9/1977 | Buess et al. | |
| 5,038,065 A | 8/1991 | Matsubayashi et al. | |
| 5,258,697 A | 11/1993 | Ford et al. | |
| 7,360,303 B2 * | 4/2008 | Hirota et al. | ................... 29/606 |

* cited by examiner

*Primary Examiner* — Bentsu Ro
*Assistant Examiner* — David Luo
(74) *Attorney, Agent, or Firm* — Birch, Stewart, Kolasch & Birch, LLP.

(57) ABSTRACT

An electric machine including: a first part, being a stator or rotor/runner, including a first segment with a first number of mutually spaced poles; a second part, being a rotor/runner or stator, including a second segment with a second number of mutually spaced poles arranged to transduce between electrical and mechanical energy by magnetic interaction with the poles of the first segment, the second segment having substantially the same length as the first segment; and permanent magnets in the poles of the first or second parts, the second number differing from the first number by one, with sufficiently deep gaps between the poles of each part to attenuate magnetic interactions between a body of each part and the poles of the other part, wherein each part is symmetrical in a direction transverse a direction of motion between the first part and the second part and transverse a depth of the parts.

20 Claims, 15 Drawing Sheets

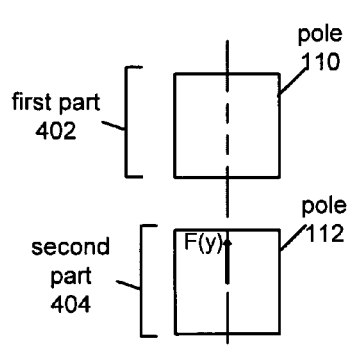
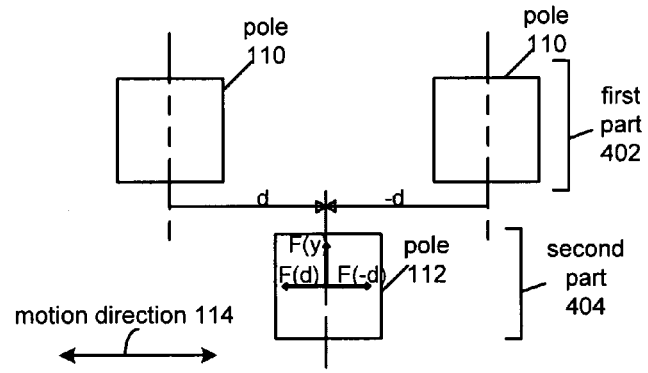
Figure 4a  Figure 4b
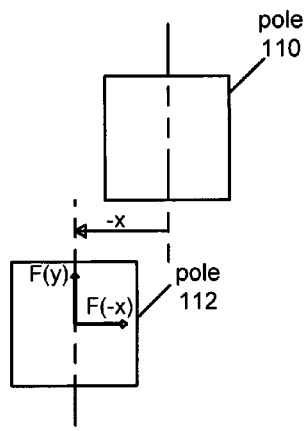
Figure 4c
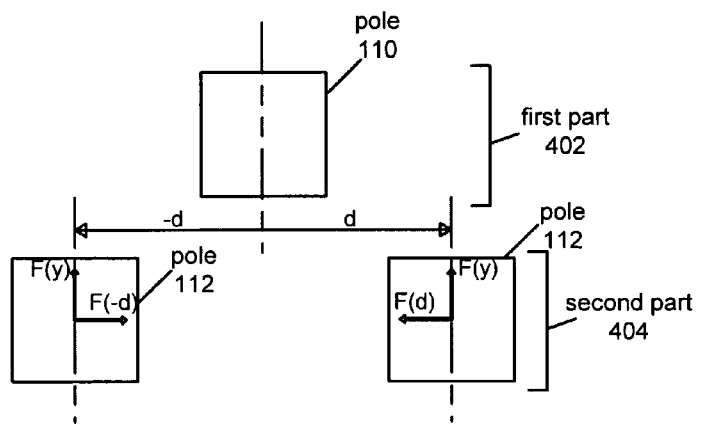
Figure 4d

ELECTRIC MACHINE

This application is the national stage under 35 U.S.C. §371 of International Application No. PCT/AU2009/001457 filed on Nov. 10, 2009, which claims priority under 35 U.S.C. §119 (a)-(d) of Application No. 2008905813 filed in Australia on Nov. 11, 2008.

FIELD

The present invention relates to an electric machine, particularly an electric machine with permanent magnets, arranged for reducing magnetic interference forces.

BACKGROUND

In existing electric machines, including those with permanent magnets, magnetic interference forces contribute to undesirable energy loss, machine wear and/or interruptions to smooth operation. Electric machines, also referred to as electrical machines, include linear and rotary motors and generators. Magnetic interference forces (including torques) include forces caused by magnetic interactions that hinder, or at least do not contribute to, efficient transduction between electrical and mechanical energy, and therefore reduce the efficiency and/or smooth operation of the electric machine. The magnetic interference forces can include forces opposing the motion (e.g., cogging torque in a rotary machine) and attraction forces between moving parts (e.g., between the rotor and the stator) which can contribute to friction, stiction and forces on the bearings in the machine. For example, there can be particular positions on the path of motion of the machine's segments where magnetic interference forces, including an opposition force that acts in the opposite direction to the motion, acts to reduce the efficiency of the machine. To overcome the opposition force, additional power must be supplied to the electric machine which may be particularly problematic when starting the machine.

In existing electric machines, having permanent magnets spaced along the periphery in the rotor body in close proximity to the stator poles, may cause undesirable magnetic forces between the stator poles and the rotor. For electric machines with electromagnets, having the stator poles in close proximity to the rotor iron core may cause undesirable magnetic forces between the stator poles and the rotor body when the electromagnet is energised. In existing electric machines, embedding a magnet in a magnetic material may decrease the magnet efficiency.

Electric motors are controlled by electrical power sources and transduce electrical power into mechanical power. Existing electric motors can have inefficient control circuits and processes for providing power to the electrical coils that generate the dynamic magnetic fields, particularly at higher operating frequencies.

It is desired to address or ameliorate one or more disadvantages or limitations associated with existing electric machines, or to at least provide a useful alternative.

SUMMARY

In accordance with the present invention, there is provided an electric machine including:
- a first part, being a stator or rotor/runner, including a first segment with a first number of mutually spaced poles;
- a second part, being a rotor/runner or stator, including a second segment with a second number of mutually spaced poles arranged to transduce between electrical and mechanical energy by magnetic interaction with the poles of the first segment, the second segment having substantially the same length as the first segment; and
- permanent magnets in the poles of the first or second parts, wherein the second number differs from the first number by one to substantially reduce the magnetic interference forces in the direction of motion, wherein gap depths in gaps between the poles of each part are sufficiently deep to substantially attenuate magnetic interactions between a body of each part and the poles of the other part, thereby reducing magnetic interference forces between the first part and the second part, and wherein each part is symmetrical in a direction transverse a direction of motion between the first part and the second part and transverse a depth of the parts for substantially balancing magnetic forces acting perpendicular to the direction of motion.

In embodiments, the second part moves relative to the first part during operation of the machine, and the magnetic interference forces include forces and torques such as the cogging torque. Each part has a body of soft magnetic material which can be magnetically attracted to the magnetic poles (either permanent magnets, or electro-magnetised poles) on the other part. Keeping a large distance between the poles of one part and the body of the other part will reduce forces of attraction between them (and thus undesirable forces perpendicular to the direction of motion). The minimum depth of the gaps of the first part is substantially equal to one thickness of the permanent magnet used on one part, i.e., the overall gap depth, from the magnet pole face to the body, is equal twice the magnet thickness.

The gap depths of the part with the permanent magnets, excluding any permanent magnet (PM) thickness, can be approximately equal to at least the PM thickness, and preferably within 20%, 10%, or 5%, or substantially equal to the pole widths of the part.

The poles of each part can be substantially equally spaced on each part, with the gaps between the poles being within about 20%, 10%, or 5%, or substantially equal to the pole widths of the poles on each part.

The poles on each part can be arranged symmetrically on an axis perpendicular to the direction of motion, thereby providing directly opposing equal magnetic interference forces perpendicular to the direction of motion, and thus substantial cancellation of forces normal to the direction of motion.

The poles of the first part can include electrical coils, and the poles of the second part can include the permanent magnets. Alternatively, the poles of the first part can include the permanent magnets, and the poles of the second part can include electrical coils.

The polar faces of the permanent magnets can alternate on adjacent poles. For example, the polar faces of the permanent magnets on one part alternate North-South-North-South-North-South along the entire part.

The electric machine can be a rotary machine wherein the length of each segment is an angle. The first part can be the rotor and the second part can be the stator (or vice versa). The first segment can form a first half of the first part of the rotary machine, and the second segment can form a first half of the second part of the rotary machine. This can allow a reduction of radial magnetic interference forces. Alternatively, the electric machine can be a linear machine wherein the length of each segment is a distance. The first part can be the runner or mover, and the second part can be the stator (or vice versa).

The electric machine can be a motor driven by a controller having an electrical period. In some embodiments, each coil receives electrical power from the controller during a first half of the electrical period, via a single switch. In other embodiments, each coil receives positive electrical power from the controller during a first half of the electrical period, and negative electrical power during a second half of the electrical period. Each coil can receive the electrical power via four switches in an H-bridge configuration, or via two switches in a half-bridge configuration.

Each coil can receive the electrical power for approximately a quarter of the electrical period.

The machine can be a generator that receives a mechanical power input via a rotor or runner, and terminals of each coil can provide an electrical power output. A first set of coils can receive electrical power while a second set of coils can provide an electrical power output. This allows the machine to function as a motor and a generator simultaneously. The first part can be the rotor in a rotary generator, or the runner in a linear generator.

An electric machine can include: a first electric machine; and a second electric machine, wherein the first electric machine and the second electric machine have the same numbers of poles on their respective parts, and share a common drive shaft, and wherein the poles of the first electric machine are offset from the poles of the second electric machine to reduce magnetic interference forces. Having rotors in the same shaft with offset poles can further reduce magnetic interference forces, such as cogging torque, by cancelling out the magnetic interference forces at positions where the force on one of the individual machines is non-zero.

The electric machine can be part of an electrical power system.

In embodiments, the electric machine's geometry provides, for many positions of translation (for a linear machine) or rotation (for a rotary machine), a cancellation or reduction or balancing of magnetic interference forces compared to existing electric machines. The magnetic interference forces are caused by magnetic interaction between the two parts of the machine: between the stator and the rotor (in a rotary machine), or between the stator and the runner (in a linear machine). The magnetic interference forces may be in the direction of motion of the machine (tangential forces and torques in a rotary machine, e.g., cogging torque) or directly between the two parts (radial forces in a rotary machine). The reduction of magnetic interference forces reduces the power required to provide motion in an electric machine (a motor and/or a generator), and thus increases its efficiency and/or smoothness of operation.

BRIEF DESCRIPTION OF THE DRAWINGS

Preferred embodiments are hereinafter further described, by way of example only, with reference to the accompanying drawings, which are not to scale, wherein:

FIG. 4a is a schematic diagram of a pole of the first part and a pole of the second part arranged in alignment with each other transverse the direction of motion;

FIG. 4b is a schematic diagram of a pole of the second part arranged halfway between two poles of the first part in the direction of motion;

FIG. 4c is a schematic diagram of two poles of the second part arranged symmetrically in a direction of motion with two poles of the first part;

FIG. 4d is a schematic diagram of a pole of the first part arranged halfway between two poles of the second part in the direction of motion;

DETAILED DESCRIPTION

Herein described is an electric machine (such as a rotary motor, rotary generator, linear motor or linear generator) with two parts that are arranged to transduce between electrical and mechanical energy by magnetic interaction. The two parts are for example a stator and a rotor (in a rotary machine) or a stator and a runner (in a linear machine). Each part includes an integer number of segments of equal length (angular length for a rotary machine or linear length for a linear machine).

Machine Configuration

Figure 1:
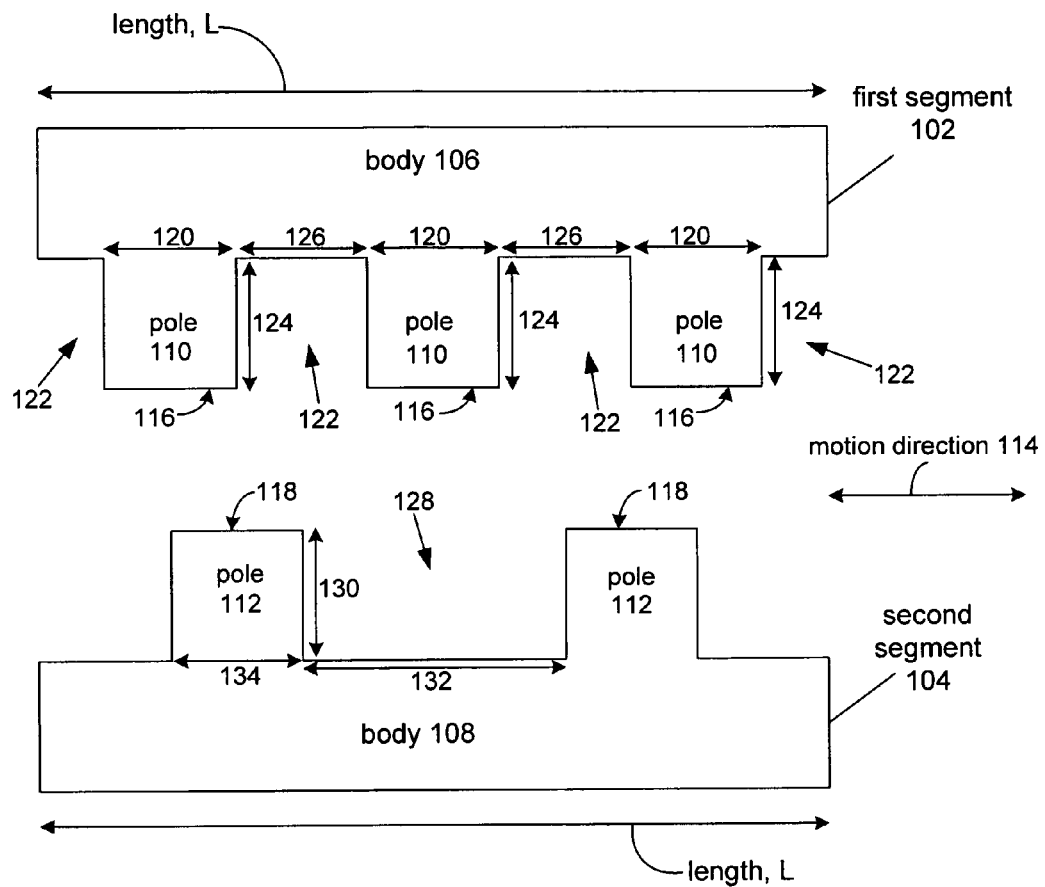
FIG. 1 is a schematic diagram of a first segment of a first part of an electric machine and a second segment of a second part of the electric machine.

As shown in FIG. 1, the segments, for example a first segment 102 and a second segment 104, each include a body 106, 108 and one or more poles 110, 112. The two segments 102, 104, during operation, move relative to one another in a motion direction 114 aligned with the rows of poles 110, 112. The two segments 102, 104 interact magnetically due to magnetic fields generated by magnets included in the poles 110,

112. The magnets cause magnetic fields to link primarily the pole faces 116 of the first segment 102 to adjacent pole faces 118 of the second segment 104. Magnetic forces caused by these magnetic fields provide a movement of the segment 102, 104 in the motion direction 114 in an electric motor, and in an electric generator currents generated in a coil wrapped around a pole, for example pole 112 of second segment 104, by movement of these magnetic fields generate electricity when the segments 102, 104 are moved relative to one another in the motion direction 114.

The body 106, 108 of each segment 102, 104 is primarily formed of a soft magnetic material, such as Silicon Iron, Cobalt Iron, Nickel Alloys, Low Carbon Steel, Magnetic Stainless Steel, etc.

Figure 2:
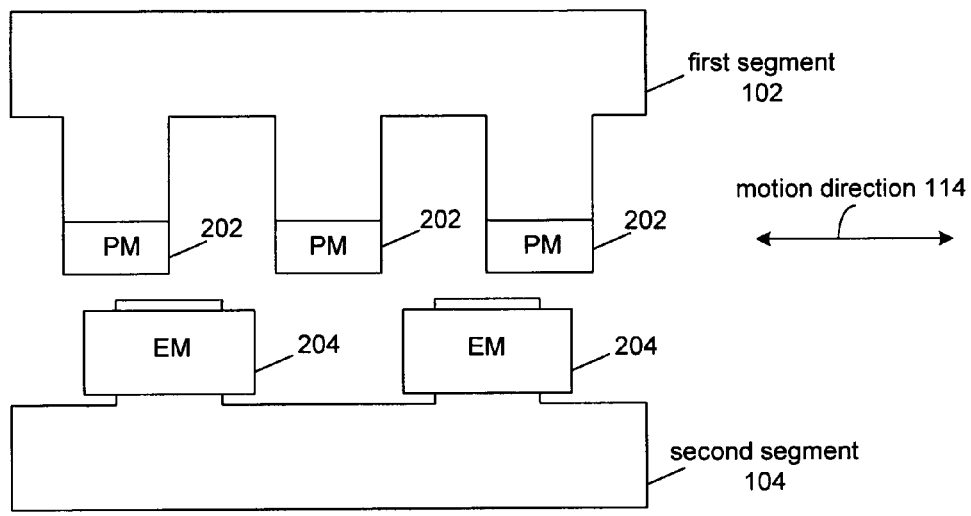
FIG. 2 is a schematic diagram of the first segment including permanent magnet poles and the second segment including electromagnet poles.
Figure 3:
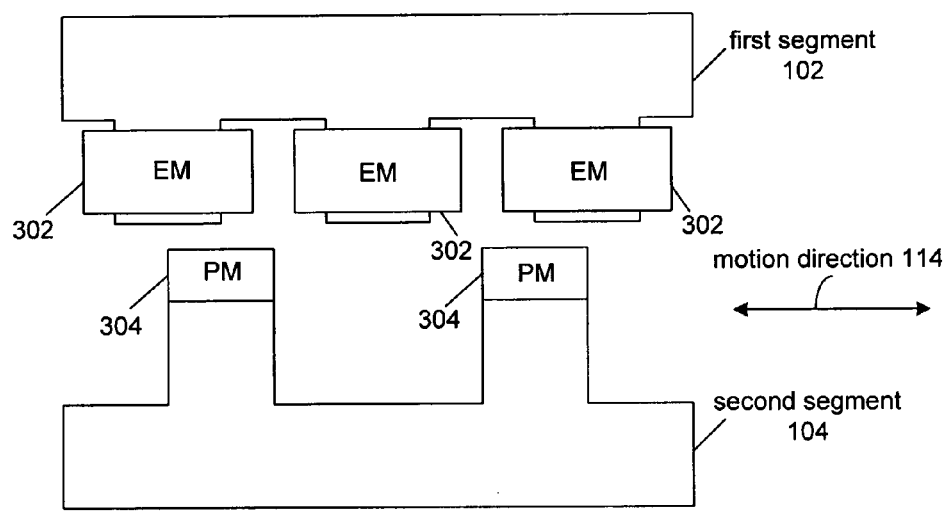
FIG. 3 is a schematic diagram of the first segment including electromagnet poles and a second segment including permanent magnet poles.

The poles 110 of the first segment 102 are formed of the soft magnetic material and include magnets, which can be permanent magnets 202, as shown in FIG. 2, or electro magnets 302, as seen in FIG. 3. Each pole 110 of the first segment 102 is formed with a substantially equal first pole width 120. Between adjacent poles 110 of the first segment 102 a gap 122 in the magnetic material of the first segment 102 is formed to create a region of high magnetic permeability where it is more difficult to link magnetic fields than in the body 106 and the poles 110. Each gap 122 has a gap 124 between the pole face 116 and the body 106 (the gap depth 124 is also known as the "pole height"), excluding any permanent magnet on the face of the pole face 116. Each gap 122 also has a gap width 126 which is substantially equal to the pole width 120. The gap width 126 is an angular width in a rotary machine.

To reduce air friction ("windage") in the machine, non-magnetic materials, such as Aluminium, Copper, Plastic, etc. can be inserted into the gaps 122 and/or 128.

Each pole 112 of the second segment 104 is separated from the adjacent pole 118 in the second segment 104 by a gap 128, which also has a height 130 and a width 132, correspondingly similar to the gap 122, gap height 124 and gap width 126 of the first segment 102.

The poles 112 of the second segment 104 have a pole width 134 similar to the pole width 120 of the first segment 102 and substantially equal to the gap width 132. Each pole 122 of the second segment is formed of the soft magnetic material and includes a magnet which can be an electromagnet 204, as shown in FIG. 2, or a permanent magnet 304, as shown in FIG. 3. Each electromagnet 204 includes a coil of magnetic wire such as copper wire.

Each segment 102, 104 is of equal length L (which can be angular length in a rotary machine), but has an unequal number of poles 110, 114, as in an example shown in FIGS. 1, 2, and 3. One segment has a first number of poles (e.g., the first segment 102 has three poles 110) and the other segment has a second number of poles (e.g., the second segment has two poles 112), and the second number of poles differs from the first number of poles by one (i.e., the second number can be greater or less than the first number by one pole). In other words, one segment has a number of poles n, and the other segment has a number of poles n+1. This ratio of the number of poles between the two segments, n:(n+1), allows for a reduction in the magnetic interference forces, in particular magnetic interference forces acting in the motion direction 114, such as cogging torque, which opposes motion in a rotary machine.

By having the pole ratio n:(n+1), magnetic forces caused by the magnetism of the poles 110, 112, in the motion direction 114 substantially cancelled out for a plurality of positions of the two segments 102, 104 relative to each other in the motion direction 114. For example, for a direct alignment of a pole 110 of a first part 104 and a directly adjacent pole 112 of a second part 404 of the electric machine, as shown in FIG. 4a, the magnetic forces between the two poles 110, 112 do not include any component in the motion direction 114. Similarly, for a pole 112 of the second part 404 arranged to be half way between two poles 110 of the first part 402 in the motion direction 114, as shown in FIG. 4b, the magnetic forces between the poles 110, 112 balance out in the motion direction 114, so there is zero net force acting in the motion direction 114 between the poles 110, 112 in this arrangement. Similarly, for a pair of poles 112 of the second part 404 arranged symmetrically with a pair of poles 110 of the first part 402, as shown in FIG. 4c, there is no force in the motion direction 114 as the forces between the poles 110, 112 substantially balance out in this position. Similarly, for a pole 110 of the first part 402 arranged half way between two poles 112 of the second part 404 in the motion direction 114, the forces, as shown in FIG. 4d, the forces in the motion direction 114 balance out. Having the poles 110, 112 arranged in segments 102, 104 of equal length and integer number in each part 402, 404 of the electric machine provides for the poles 110, 112 to be arranged in the positions of zero force in the motion direction 114 (as shown in FIGS. 4a, 4b, 4c and 4d) at a plurality of points in position/time as the two parts 402, 404 move relative to each other in the motion direction 114. The arrangement can substantially reduce magnetic interaction forces in the motion direction 114.

A higher value of n will provide higher number of positions where the cancellation of magnetic interference force occurs. At positions between points where cancellation exists, the resultant force in the motion direction 114 will be non-zero, but is not substantial for large values of n, e.g., for n greater than 3, or as large as practicable. In general, a cooperating pair of segments, with n and (n+1) will possess $2*n*(n+1)$ positions per segment length L where the resultant force in the motion direction 114 is substantially zero. A higher value of $2n(n+1)$ provides a higher reduction in magnetic interference forces in the direction of motion.

Figure 5:
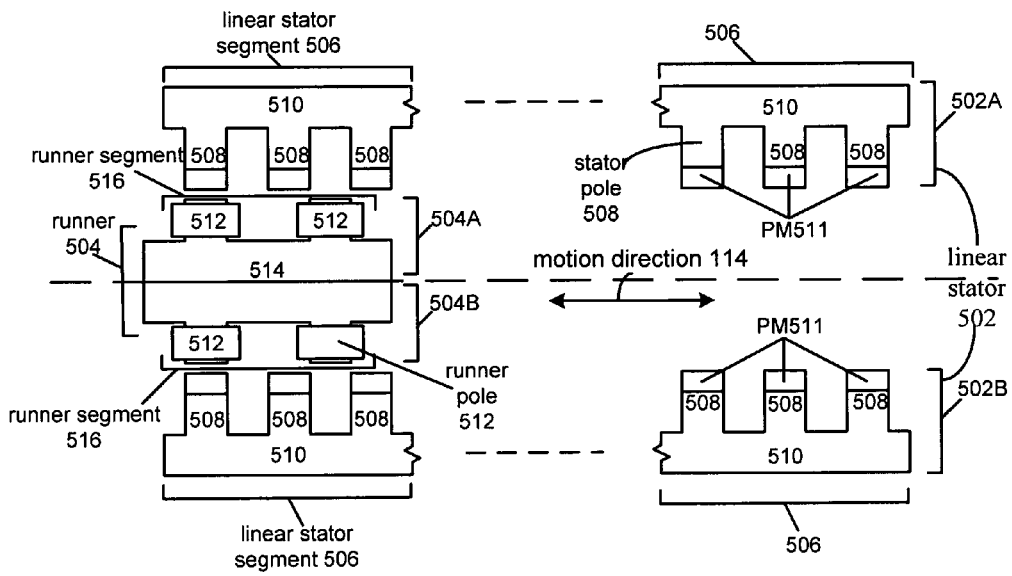
FIG. 5 is a schematic diagram of a linear electric machine having a stator including a plurality of segments and permanent magnets.

For example, a linear electric machine 500, as shown in FIG. 5, includes a first part in the form of a linear stator 502, and a second part in the form of runner 504. The linear stator 502 includes a plurality of linear stator segments 506 each of which has a plurality of stator poles 508 and a body 510. Each stator pole 508 includes a permanent magnet 511 at each pole face. The stator poles 508 are equally spaced with gaps between the poles 508 of equal width with the poles 508 themselves (i.e., the gap width is equal to the pole width). The runner 504 includes runner poles 512, which include electromagnets, and a body 514. The runner 504 includes two runner segments 516, each of which has two poles 512 and shares the same body 514.

In the linear electric machine 500, the runner 504 has a length of one runner segment 516, which includes two runner poles 512. The linear stator 502 includes a plurality of linear stator segments 506, each of which is the same length as the runner segment 516, and each of which includes three stator poles 508. Thus the runner segment 516 has n number of poles, and the linear stator segment 506 has a number n+1 number of poles.

The linear stator 502 in the linear electric machine 500 is arranged on opposite sides of the runner 504 to provide balancing of magnetic forces perpendicular to the motion direction 114 and transverse the depth of the parts (e.g., from between the top and the bottom, or between two opposite sides). The depth of each part is depth along the dimension shown into the page in FIG. 5. The two parts of the machine, being the linear stator 502 and the runner 504, are symmetrical in a direction perpendicular to the motion direction 114, and this allows a substantial reduction in the magnetic interference forces acting perpendicular to the motion direction 114. For example, if only one side, e.g., linear stator segments 506 forming one side 502A of the linear stator 502, and the runner segment 516 forming the same corresponding side 504A of the runner 504, were operating together, magnetic forces acting perpendicular to the motion direction 114 between the parts 502A, 504A, would experience substantial forces perpendicular to the motion direction 114, which would need to be counteracted using mechanical means, e.g., guiding rails. By providing a symmetrical mirror image of each pair of interacting sets of poles, the magnetic interference forces perpendicular to the motion direction 114 are substantially reduced. Reducing these forces allows for smoother and more efficient operation of the electric machine.

Figure 5A:
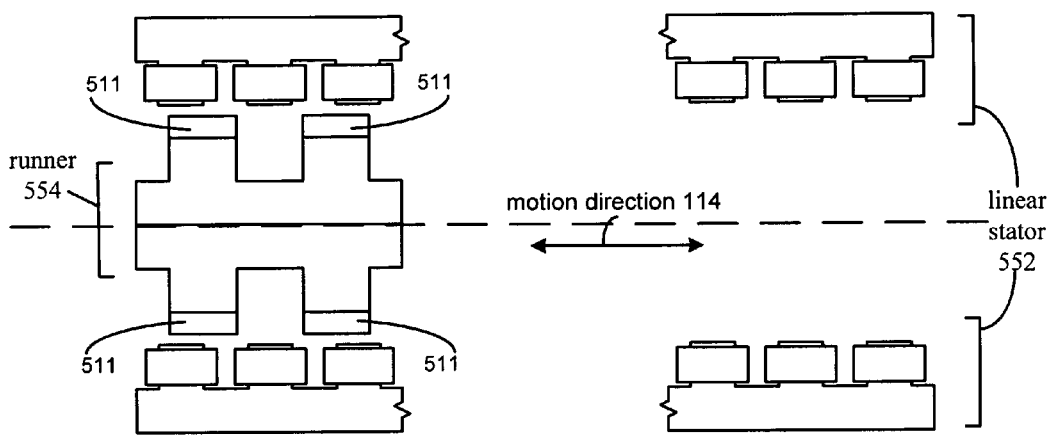
FIG. 5A is a schematic diagram of a linear electric machine having a stator including a plurality of segments and electromagnets.

A linear electric machine 500A, as shown in FIG. 5A, includes a first part in the form of a linear stator 552 and a second part in the form of a runner 554 with a permanent magnet 511 at each pole face. The arrangement of the linear electric machine 500A corresponds to the arrangement of the linear electric machine 500 described above, except the linear stator 552 includes poles with permanent magnets and the runner 554 includes poles with electromagnets 511. The operation of the linear electric machine 500A is correspondingly similar to that of the linear electric machine 500.

To optimise the performance of the electric machine during operation (i.e., the dynamic phase), the height of each pole with a permanent magnet (PM), excluding the PM thickness, is at least the PM thickness, and preferably within 20%, 10%, or 5% or substantially equal to the pole widths of the part. This substantially reduces any forces of attraction between the pole magnets and the soft magnetic material of the body. This also allows for almost all of the magnetic field lines to be directed between adjacent poles on the different parts, and not directed towards the body of either part. Thus these field lines will mainly be contributing to the generation of useful force/torque.

The values/sizes of the gap widths 126, 132 depend on the magnet height and the type of magnet used (e.g., Neodymium Iron Boron, Samarium Cobalt, Ceramic, or Alnico) to substantially reduce magnetic fringe fields at the ends of the magnet that interact with neighbouring or next-to-adjacent poles of the other part. The values of the gap width 126, 132 are selected in conjunction with the pole height (or gap depth) to provide sufficient space for electromagnet coil windings around respective poles. For example, the poles of each part can be substantially equally spaced on each part, with the gaps between the poles being within about 20%, 10%, or 5%, or substantially equal to the pole widths of the poles on each part.

Figure 6:
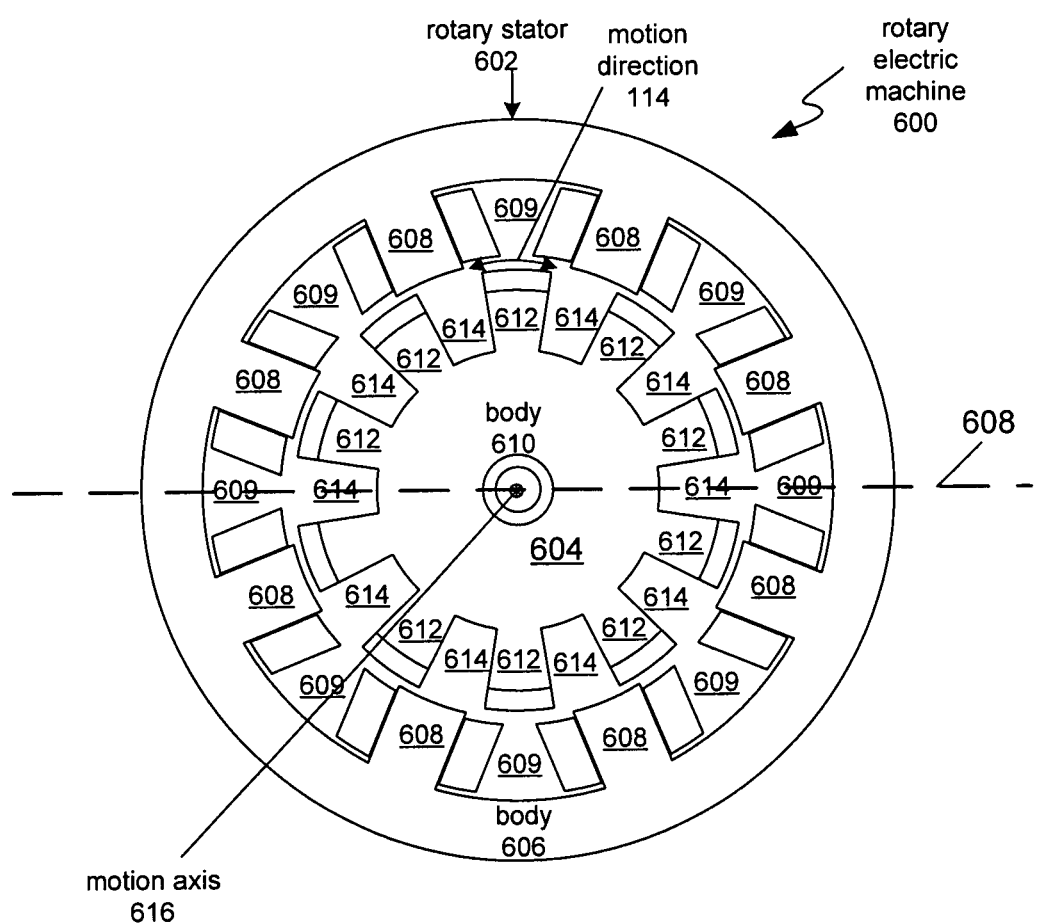
FIG. 6 is a schematic diagram of a rotary electric machine having a rotor and a stator each including a plurality of segments.

The electric machine can be a rotary electric machine 600, which includes a rotary stator 602 and a rotor 604, as shown in FIG. 6. The rotary stator 602 includes a body 606 of soft magnetic material and a plurality of stator poles 608 spaced equally about the rotary stator 602 with equal gaps 609 between adjacent stator poles 608. The stator gaps 609 are substantially equal in angular width to the stator poles 608. Each stator pole 608 includes a magnet in the form of an electromagnet formed by windings around the pole 608. The rotor 604 includes a body 610 and a plurality of rotor poles 612 spaced equally about the rotor 604 by rotor gaps 614 of substantially equal angular width to the rotor poles 612. Each rotor pole 612 includes a magnet in the form of a permanent magnet on the pole face, facing the stator poles 608 for magnetic interaction between the poles 608, 612, which provides for transduction between the mechanical energy and electrical energy in the rotary electric machine 600. The rotor 604 rotates in the direction of motion 114 about an axis 616 in the centre of the rotor 604. The rotary stator 602 includes a plurality of stator segments, each with n stator poles 608, the stator segment being of equal angular length with a corresponding rotor segment, which includes (n+1) rotor poles 612. The rotary electric machine 600 is arranged with at least two segments in each of the rotary stator 602 and the rotor 604 and is generally symmetrical along a line perpendicular to the motion direction 114 and transverse the depth of the rotor 604 and stator 602, to allow for substantial cancellation (or balancing) of magnetic interference forces in the radial direction (i.e., radial to the motion axis 616) in an equivalent cancellation (or balancing) of transverse magnetic interference forces described above with reference to the linear electric machine 500. The depth of the rotor 604 and the stator 602 is the depth of the machine along its axis of rotation.

In the rotary electric machine 600, n=4 and the rotor 604 consists of one segment with a permanent magnet attached to each of its five poles 612, and a diametrically opposed segment also with five poles 612. The rotary stator 602 consists of one segment with an electromagnet (formed by a coil) on each of its four poles 608, and a diametrically opposed segment also with four poles 608. The angle subtended by the rotor segment is 180 deg. The angle subtended by the stator segment is also 180 deg. The diametrically opposed segments of each part are shown on opposite sides of the dotted line 618 in FIG. 6.

Figure 7A:
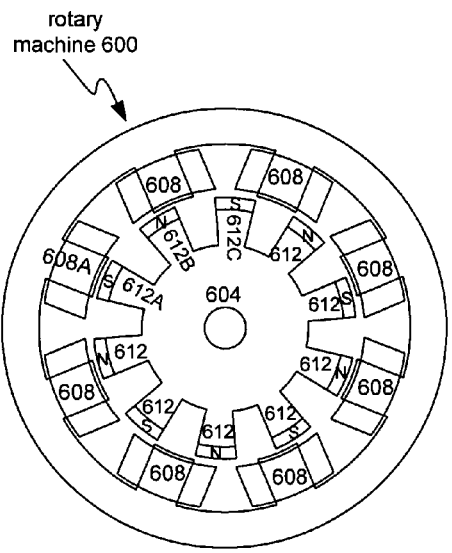
FIG. 7a is a schematic diagram of the rotary electric machine in a zero-degree position.

The electric machine 600 can be configured with magnets of all of the rotary poles 612 have pole faces with alternating polarity, i.e., North/South/North/South/etc. as shown in FIG. 7a.

The electric machine 600 can be used as a rotary motor to transduce electrical energy into mechanical energy (that is, rotation of the rotor 604) by magnetic interactions between the permanent magnets on the rotor poles 612 and the electromagnets on the stator poles 608. An electric current from an electrical power supply is directed through the coils (windings) of the electromagnets, thereby generating magnetic fields that exert forces on the permanent magnets of the rotor 604. The magnetic field of each stator pole 608 is controlled, both in strength and direction, by the electric current in the electromagnet.

Electrical Controller

For an electric machine configured as a motor, the electric machine can include an electrical controller for supplying the electrical current to the motor, having a switching arrangement (or "switching scheme") for controlling the motor, referred to as a driven motor. The driven motor can be a rotary electric motor with electromagnets on its stator poles, a rotary electric motor with electromagnets on its rotor poles, or a linear electric motor with electromagnets on its stator poles or runner poles. The driven motor can have n rotor/runner poles, or n stator poles. For example, the driven motor can be in the form of the rotary machine 600.

The electrical controller is configured to control the supply of electrical current to the coils of the electric machine such that magnetic fields that oppose the preferred motion of the driven motor are substantially avoided, or at least minimised. For example, even for high-frequency operation of the driven motor, described hereinafter with reference to FIGS. 10, 14 and 18, the electrical controller provides electrical power to the coils of the electromagnets of the driven motor substantially only when the resulting generated magnetic field is generally favourable to (i.e., supports) motion of the driven motor in the preferred motor direction. In this way, each coil is not driven to generate any substantial magnetic field that generates a magnetic interference force (in conjunction with the poles of the other part) generally opposing the preferred motion of the driven motor.

The electrical controller includes circuits that provide electrical current to each coil on a periodic basis, with the period Te. In example timing arrangements (i.e., time-domain arrangements) described hereinafter, the electrical drive currents are repeated in each period Te. The timing arrangements (e.g., in FIGS. 9, 10, 13, 14 17 and 18) can be described with reference to quarter-periods, that is Te/4: the start of each period is referred to as "Point A", the end of the first quarter period is referred to as "Point B", the end of the half period is referred to as "Point C", the end of three quarters of the period is referred to as "Point D", and the end of the period (which corresponds to the start of the next period) is referred to as "Point E". For a rotary driven motor, these points correspond to angular displacements of the rotor (for a fixed stator, or vice versa). For different machines, these angular displacement points, corresponding to quarter-electrical-period movements of the motor, have different values for difference values of n.

Figure 7B:
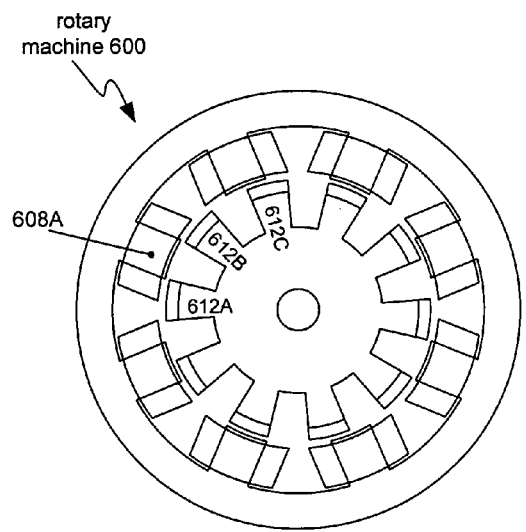
FIG. 7b is a schematic diagram of the rotary machine in an 18-degree position.
Figure 7C:
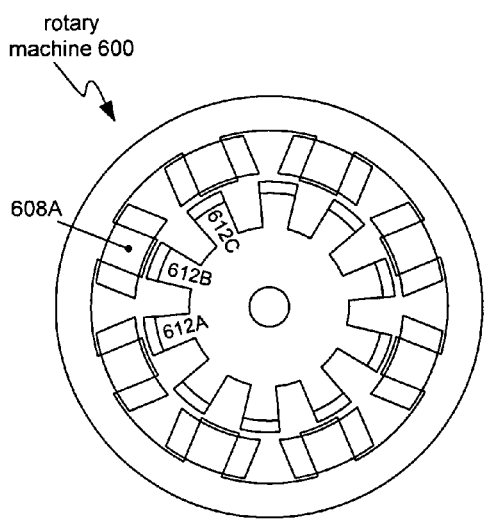
FIG. 7c is a schematic diagram of the rotary machine in a 36-degree position.
Figure 7D:
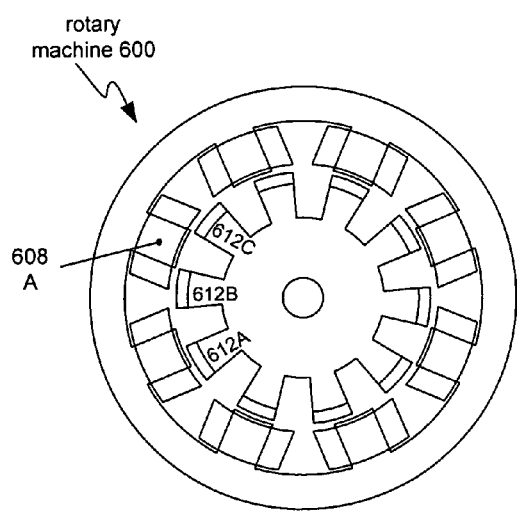
FIG. 7d is a schematic diagram of the rotary machine in a 54-degree position.

For an example driven motor in the form of the rotary machine 600, the electric current in each coil of the electromagnets is controlled, for each electromagnet, by an example electrical controller which has a timing arrangement based on the angular position of the rotor 604. The quarter-period points of the example rotary machine 600 are: (A) a first angular position of zero degrees, at the beginning of the electrical period Te (referred to as 'Point A'), where a first rotor pole 612A is aligned directly with a first stator pole 608A, as shown in FIG. 7a; (B) an 18-degree position at ¼ of Te (referred to as 'Point B'), where the first rotor pole 612A is rotated away from the first stator pole 608A by an angle of 18 degrees in the direction of motion, as shown in FIG. 7b; (C) a 36-degree position at ½ of Te (referred to as 'Point C'), where the first rotor pole 612A is rotated through an angle of 36 degrees from the first stator pole 608A, as shown in FIG. 7c; and (D) a 54-degree position at ¾ of Te (referred to as 'Point D'), where the first rotor pole 612A is rotated through an angle of 54 degrees from the first stator pole 608A, as shown in FIG. 7d. By rotation through a further 18-degree angle from Point D, the rotor 604 moves again into the zero degree position (i.e., Point A, also referred to as 'Point E', shown in FIG. 7a), with a third rotor pole 612C moving into direct alignment with the first stator pole 608A, and thereby repeating the cycle (the third rotor pole 612C has the same magnetic polarity as the first rotor pole 612A). The particular angles given in this example relate to quarter-segment movements of the two parts relative to each other for the rotary machine 600.

The driven motor has a mechanical period Tm, which refers to the time taken for the rotor to rotate through a full rotation. The relationship between the mechanical period Tm and the electrical period Te differs for different example driven motors, and in particular for the different values of n and (n+1). For example, for the driven motor in the form of the rotary machine 600, (n+1)=5 and the electrical period (Te) is ⅕ of the mechanical period (Tm).

Figure 8:
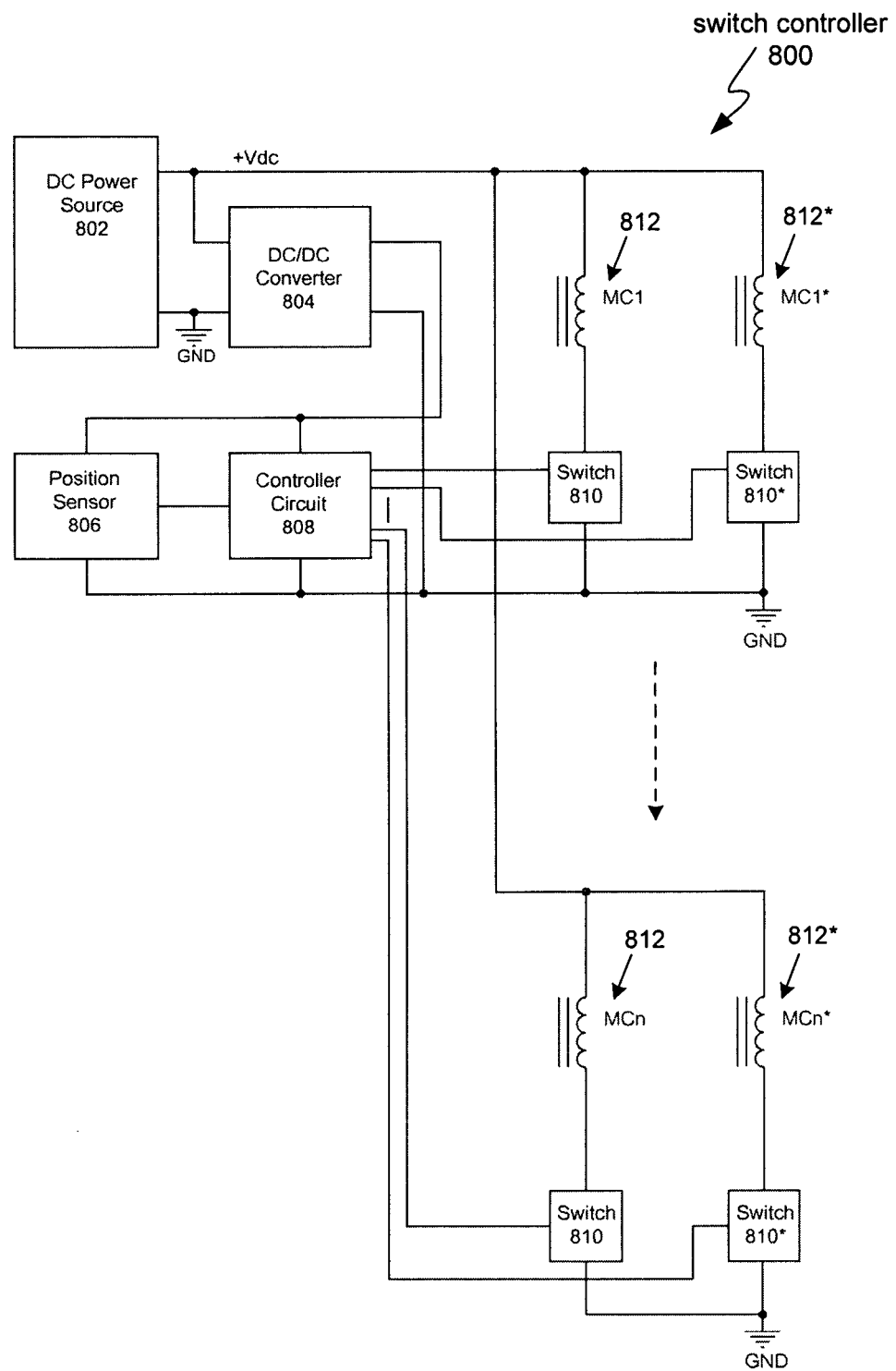
FIG. 8 is a schematic block diagram of a switch controller for an electric motor.

For an example electrical switch controller 800, as shown in FIG. 8, each electromagnet is driven by a switch. A direct current (DC) power source 802, such as an Alternating-Current-to-Direct-Current (AC/DC) converter or bank of batteries, supplies DC current to motor coils 812, 812* (also referred to as "M-coils" or "MC") of the electromagnets in a driven motor (e.g., the example machine 600) using the power electronic switches 810, 810*. A Direct-Current-to-Direct-Current (DC/DC) converter 804 converts DC power from the DC power source 802 to a suitable DC voltage for operating a position sensor 806 and a controller circuit 808. The position sensor 806 determines the position of the runner 504 or rotor 604 with respect to the stator 502, 602 and generates position signals for the controller circuit 808. The controller circuit 808 simultaneously switches (turns ON/OFF) the switches 810, 810* at precise selected times based on, and synchronised with, the position signals. Each switch is in an ON state when it is substantially conducting, and in an OFF state when it is substantially non-conducting. The controller circuit 808 also regulates the speed of the runner 504 or rotor 604 (i.e., the speed of the motor) based on an input controller, or a preset or preselected speed value.

Pairs of matching coils 812 and 812* and their respective switches 810, 810*, which are diametrically opposite in the machine, are controlled to have synchronised currents to balance and substantially cancel out (or at least reduce) opposing magnetic forces, including potential magnetic interference forces perpendicular to (or "transverse") the motion direction. By reducing or substantially cancelling magnetic interference forces generally transverse, or perpendicular to, the motion direction, undesirable friction from the motor bearings etc. can be reduced, thus increasing motor efficiency and longevity.

Figure 9:
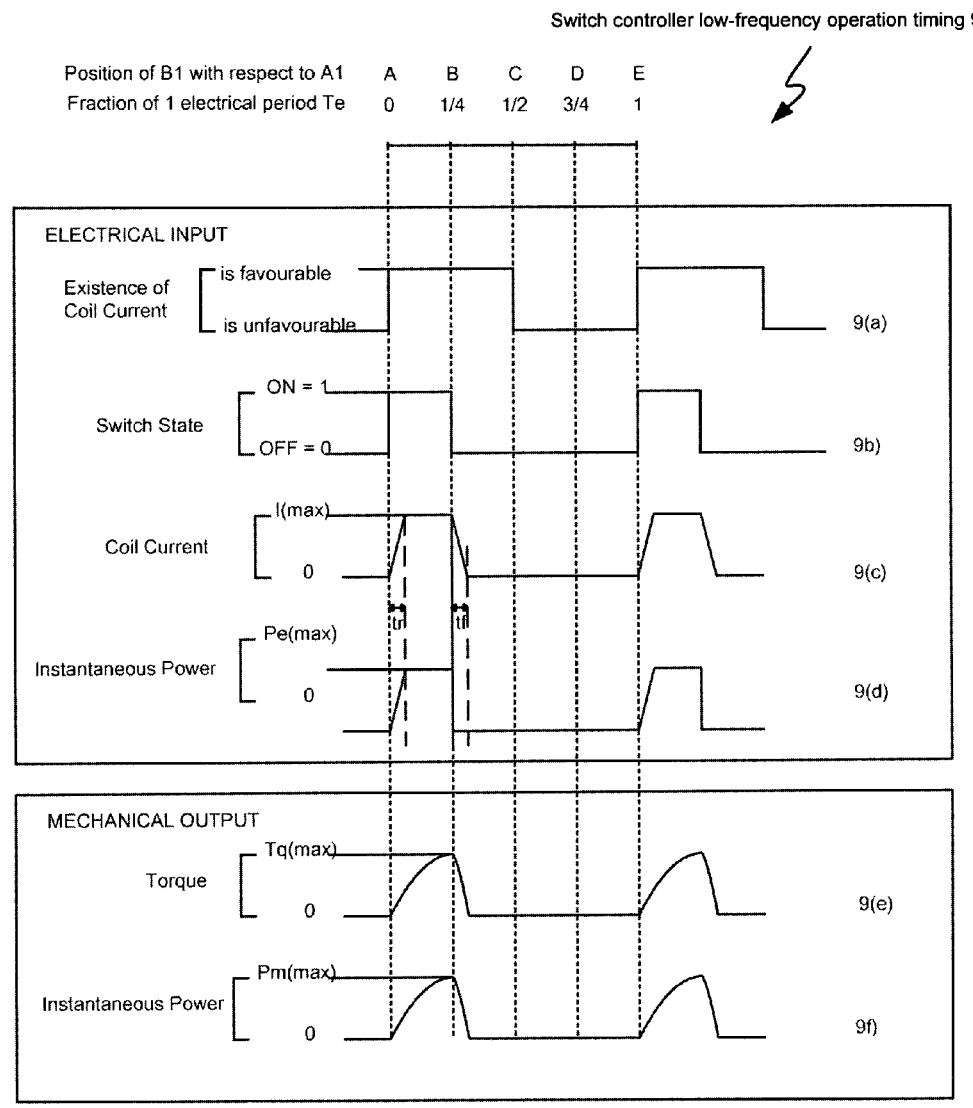
FIG. 9 is a timing diagram of the electric motor driven by the switch controller operating at a low frequency.

Electrical input waveforms and mechanical output waveforms for each coil of an example driven motor, driven by the switch controller 800 operating at a low frequency, are related as shown in FIG. 9. FIG. 9(a) shows when having a coil current is favourable between Points A and C for efficient motion. For the example machine 606, as shown in FIGS. 7a and 7b, the direction of the coil current is controlled such that the magnetization of the first stator pole 608A has the same magnetic polarity as the first rotor pole 612A when they are in alignment at Point A and until they are rotated by about Te/4 to Point B. The first stator pole 608A thus repels the first rotor pole 612A and attracts the second rotor pole 612B which has an opposite magnetic polarity to the first rotor pole 612A. FIG. 9(b) shows the switch 810 (and thus also synchronised switch 810*) is the ON state between Point A and Point B. Turning OFF the switch 810 (and thus also synchronised switch 810*) allows the coil current to decay, due to the fall time tf, and reach zero by Point C, when having coil current becomes unfavourable, as shown in FIG. 9(a). FIG. 9(c) shows the coil current waveform, including a current rise time (tr) and fall time (tf). The tr and tf are dependent on the time constant of the coil which is the ratio of the coil inductance to its DC resistance. For low frequency operation, the rise time and fall time are not a substantial part of the period Te. FIG. 9(d) shows the instantaneous power of the electrical input (Pe) which is the product of supply voltage (Vdc), the switch state (Ss) and the coil current (I), or Pe=Vdc*Ss*I. FIG. 9(e) shows the waveform of the torque developed due to the coil current. The maximum torque is at Point B. FIG. 9(f) shows the instantaneous power of the mechanical output (Pm) which is the product of the Torque (Tq) and the angular velocity of the rotor (ω), or Pm=Tq*ω.

Figure 10:
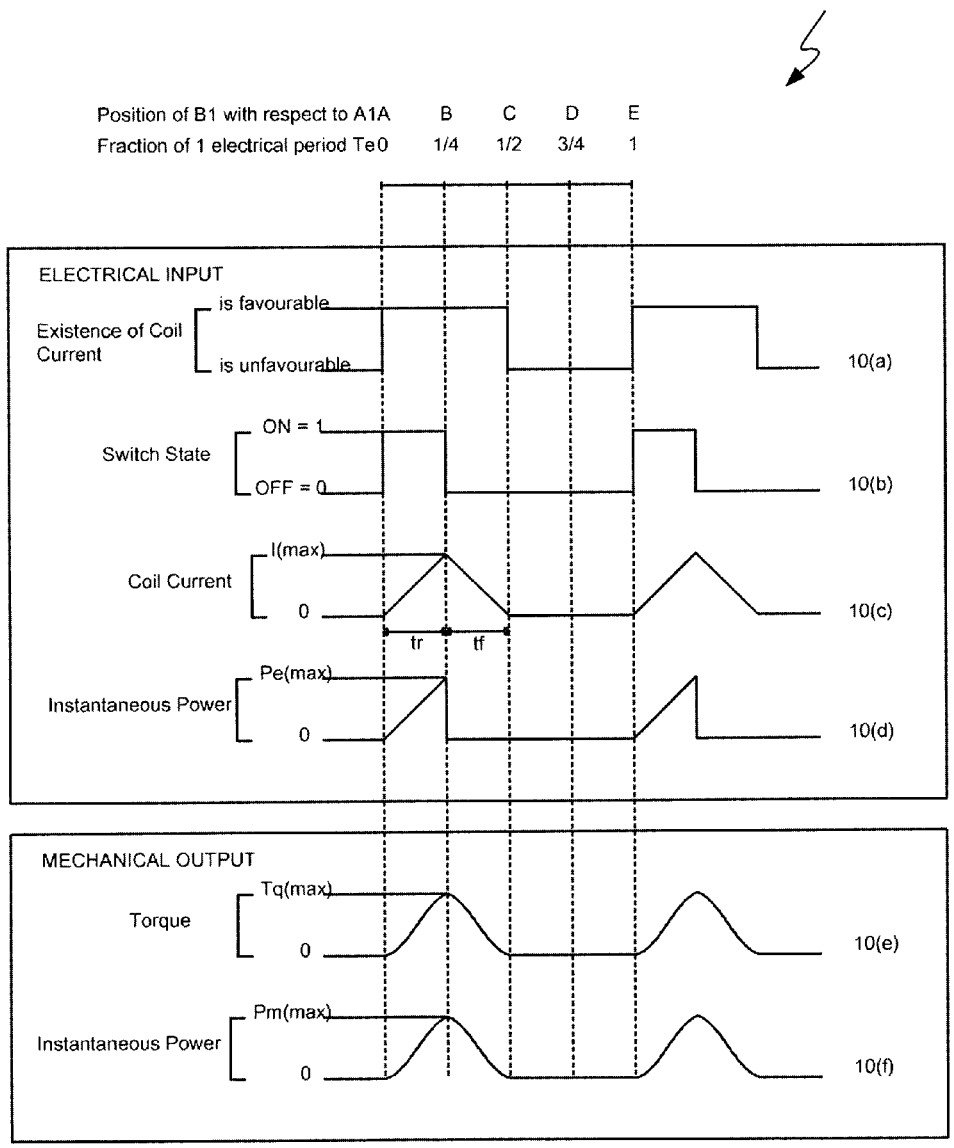
FIG. 10 is a timing diagram for the electric motor driven by the switch controller operating at a high frequency.

Electrical input waveforms and mechanical output waveforms for each coil of an example driven motor, when each coil is driven by the switch controller 800 operating at a high frequency, are related as shown in FIG. 10. The favourable times for coil current and the controlled switch states, as shown in FIGS. 10(a) and 10(b), are substantially the same as for low frequency operation; however, at a high frequency, the Te is much shorter, and thus the current rise time (tr) and fall time (tf) occupying up to a ½ of Te, as shown in FIG. 10(c). As the switch controller 800 is operating at a higher frequency than for the waveforms in FIG. 9, the waveforms in FIG. 10 show the coil current maxima and minima being limited by the rise (tr) and fall (tf) times. FIG. 10(d) shows the instantaneous power of the electrical input (Pe) which has a triangle waveform and occupies about ¼ of Te. FIG. 10(e) shows the waveform of the torque developed due to the coil current. The torque is maximum at Point B. FIG. 10(f) shows the instantaneous power of the mechanical output (Pm) which occupies about ½ of Te.

As shown in FIG. 10(c), at the high operating frequency, the coil current—rising at a rate limited by the installed characteristics of the driven motor, including inductance and resistance—only increases from its minimum to its maximum after at least a quarter of the period Te, and similarly only decreases from its maximum to its minimum after at least a second quarter of the period Te, after which time the period for "favourable" existence of coil current, as shown in FIG. 10(a) is passed: the duration of the switch being in the ON state is therefore selected to be substantially a quarter of a period to allow for the coil current to reduce to its minimum (i.e., zero in FIG. 10(c)) before the time for "unfavourable" current, in the second half of the period Te is begun while still keeping the coil current on for as long as possible. In this way, the pole corresponding to the coil will not generate any substantial magnetic field that generates a force opposing the preferred motion of the driven motor, i.e., a form of "magnetic interference force".

Figure 11:
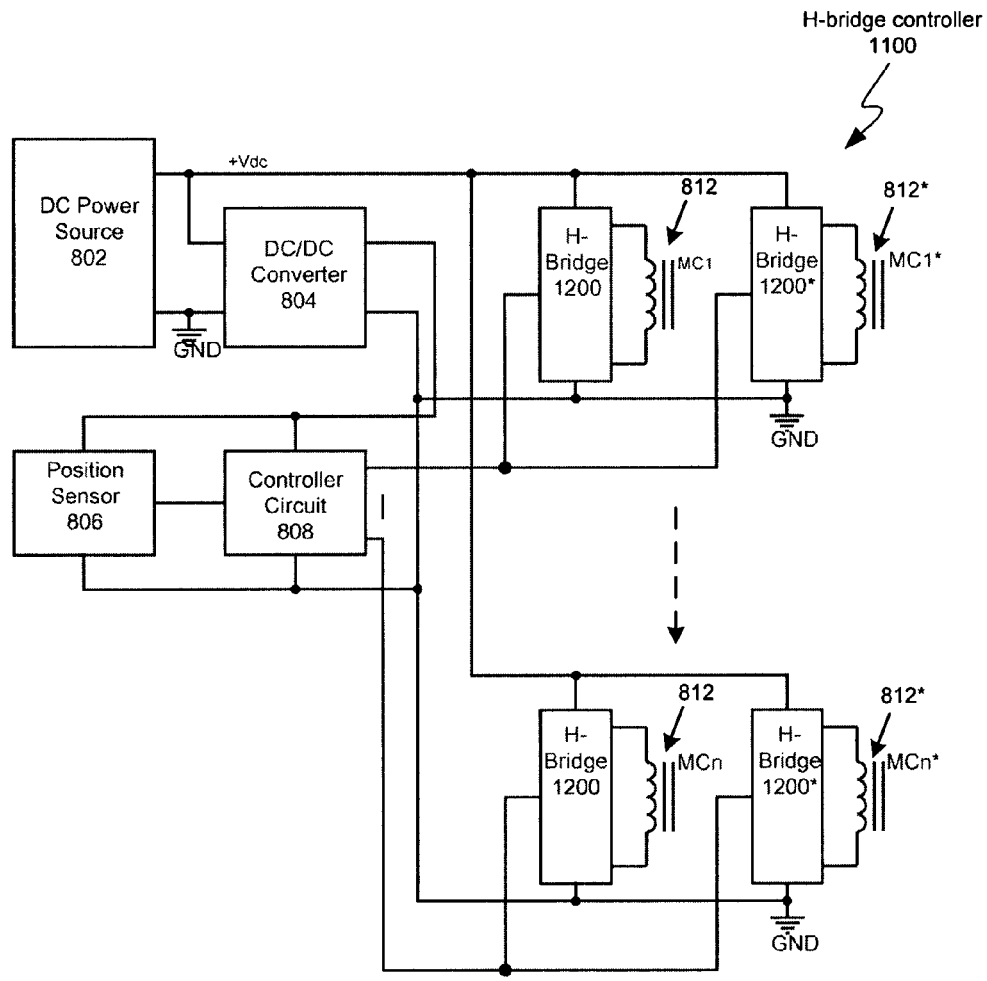
FIG. 11 is a schematic block diagram of an H-bridge controller for the electric motor.
Figure 12:
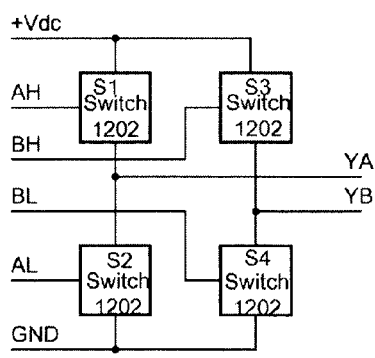
FIG. 12 is a block diagram of an H-bridge circuit of the H-bridge controller.

For an example electrical H-bridge controller 1100, each coil, MC1, MC1*, ..., MCn, MCn*, is driven by an H-bridge circuit 1200, 1200*, shown in FIG. 11. The H-bridge circuit 1200, including four switches 1202 (S1, S2, S3 and S4) allows current from the mono-polar DC source 802 (supplying +Vdc) to pass through to the coil in either direction, as shown in FIG. 12.

Figure 13:
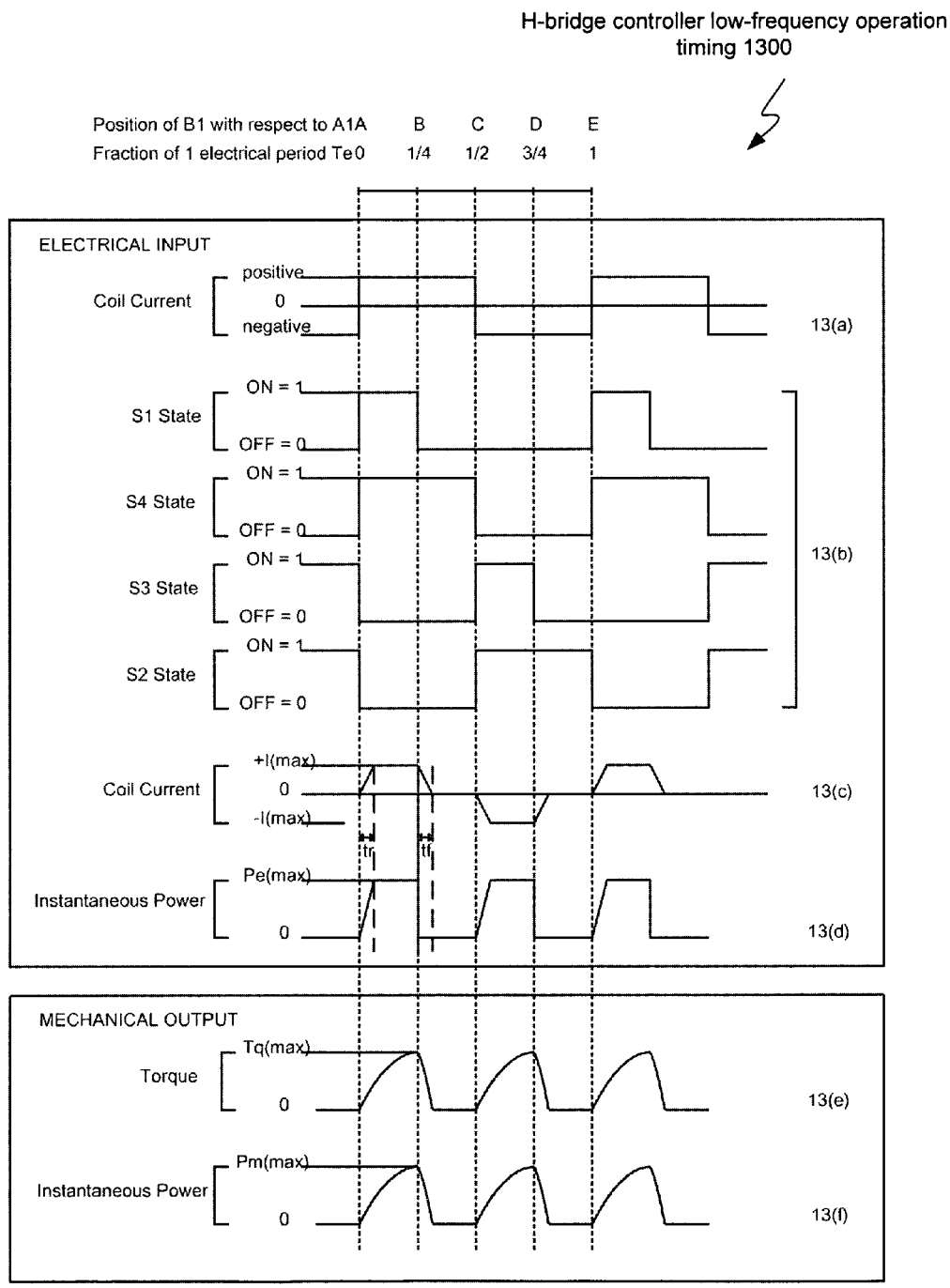
FIG. 13 is a timing diagram for the electric motor driven by the H-bridge controller operating at a low frequency.

The electrical input waveforms and the mechanical output waveforms for each coil of an example driven motor, driven by the H-bridge controller 1100 and operating at a low frequency, are related as shown in FIG. 13. FIG. 13(a) shows the waveform of an ideal coil current where it is positive during the first half of Te and is negative (or reverse) during the second half of Te. FIG. 13(b) shows the four switch states waveforms where: S1 and S4 form a pair of switches allowing positive current to pass through the coil (S1 and S4 are turned ON at Point A, then S1 is turned OFF at Point B and S4 is turned OFF at Point C); and S3 and S2 form a pair of switches allowing negative current to pass through the coil (S3 and S2 are turned ON at Point C, then S3 is turned OFF at Point D and S2 is turned OFF at Point E). FIG. 13(c) shows the coil current waveform where the current is generally positive between Points A and C and is negative between Points C to E. FIG. 13(d) shows the instantaneous power of the electrical input (Pe) where power is drawn from the source from Point A to Point B, and from Point C to Point D. FIG. 13(e) shows the waveform of the torque developed due to the coil current. The maximum torque is at Points B and D. FIG. 13(f) shows the instantaneous power of the mechanical output (Pm).

Figure 14:
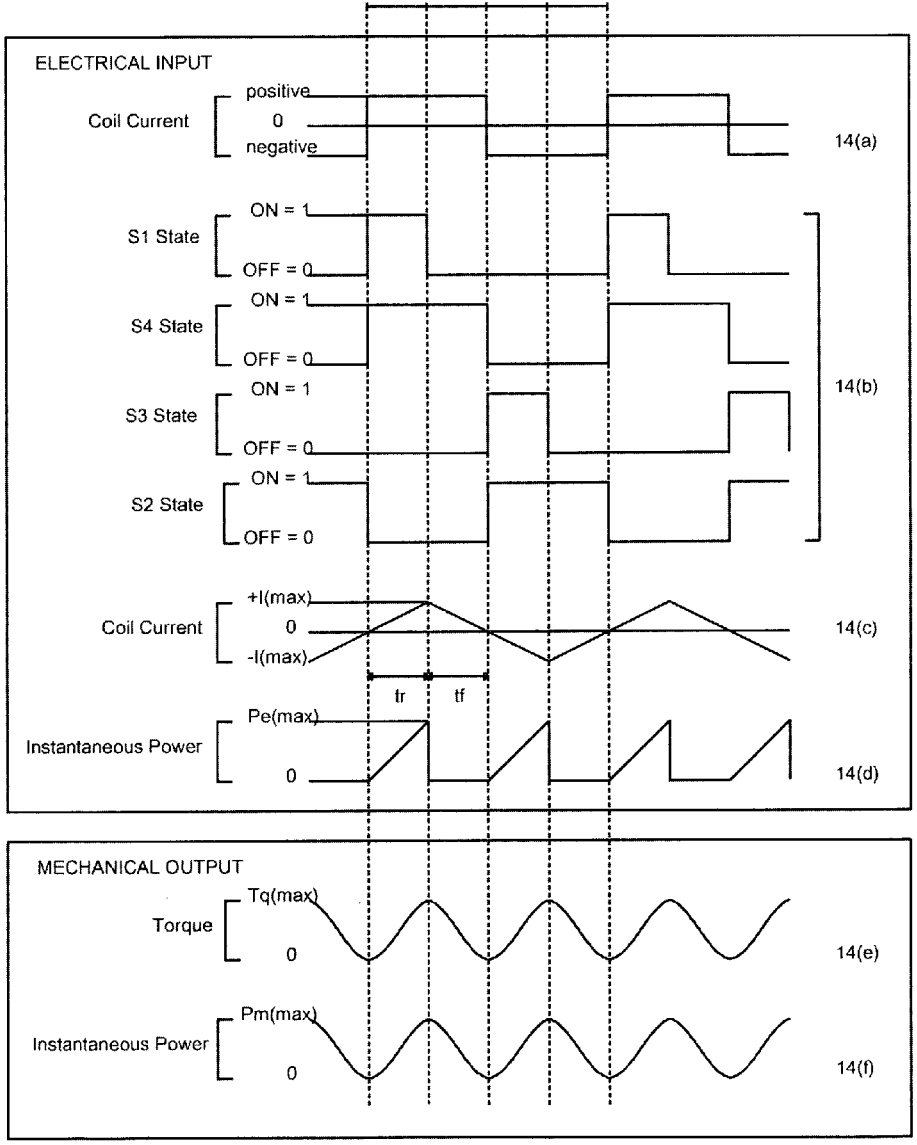
FIG. 14 is a timing diagram for the electric motor driven by the H-bridge controller operating at a high frequency.

The electrical input waveforms and the mechanical output waveforms for each coil of an example driven motor, with the H-bridge controller 1100 and operating at a high frequency, are related as shown in FIG. 14. The ideal coil current timings, as shown in FIG. 14(a), and switch timings, as shown in FIG. 14(b), relative to Te are the same as for the low frequency operation; however, the coil current is only just positive between Points A and C and is only just negative between Points C to E, as shown in FIG. 14(c). As the H-bridge controller 1100 is operating at a higher frequency than for the waveforms in FIG. 13, the waveforms in FIG. 14 show the coil current maxima and minima being limited by the rise (tr) and fall (tf) times. The preferred time to have each H-bridge circuit 1200 turned ON (i.e., conducting current) is thus about ¼ Te at the maximum operating frequency. FIG. 14(d) shows the instantaneous power of the electrical input (Pe) where power is drawn from the source from Point A to Point B and from Point C to Point D. FIG. 14(e) shows the waveform of the torque developed due to the coil current. The maximum torque is at Points B and D. FIG. 14(f) shows the instantaneous power of the mechanical output (Pm).

Figure 15:
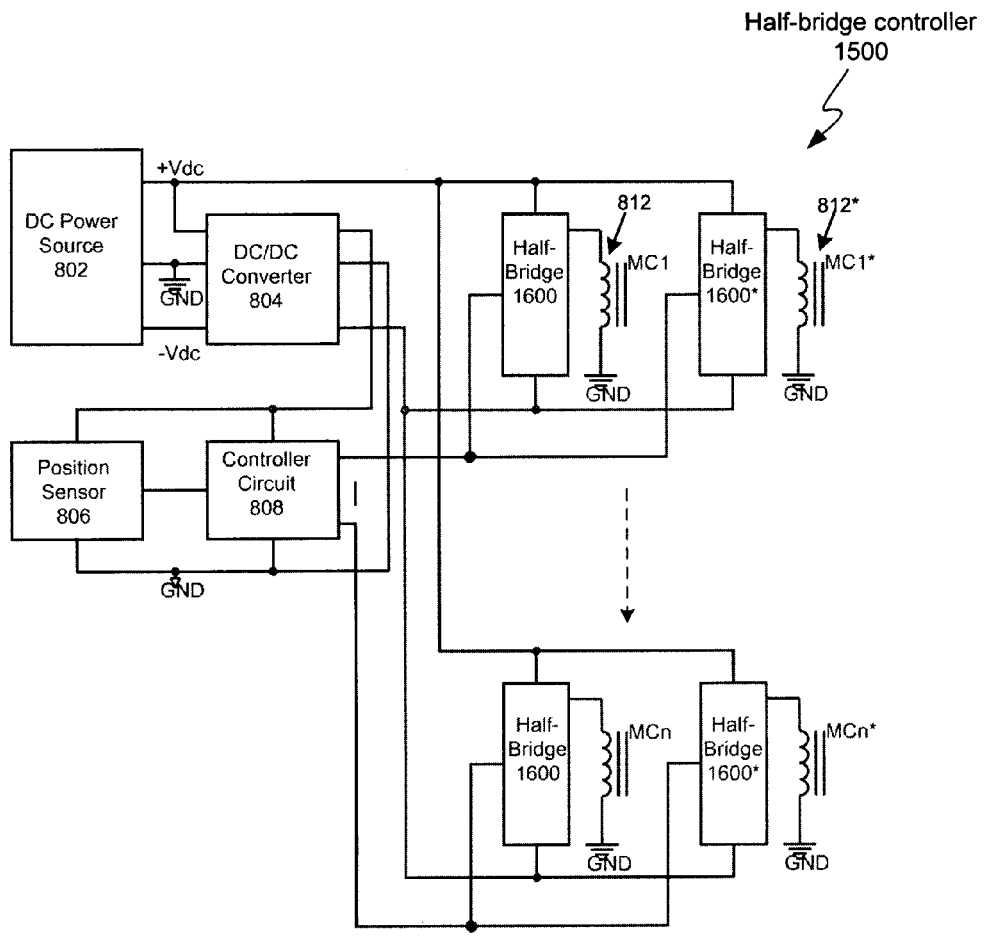
FIG. 15 is a block diagram of a half-bridge controller.
Figure 16:
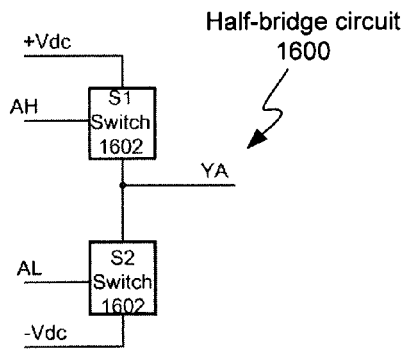
FIG. 16 is a block diagram of a half-bridge circuit of the half-bridge controller.

For an example electrical half-bridge controller 1500, each coil, MC1, MC1*, ..., MCn, MCn*, is driven by a half-bridge circuit 1600, 1600*, as shown in FIG. 15. The half-bridge circuit 1600, including two switches 1602 (S1 and S2), allows current from a bi-polar DC source 802 (supplying both +Vdc and −Vdc) to pass through the respective coil in either direction, as shown in FIG. 16. Each coil, MC1, MC1*, ..., MCn, MCn*, is connected between its respective half-bridge 1600, 1600* and electrical ground.

Figure 17:
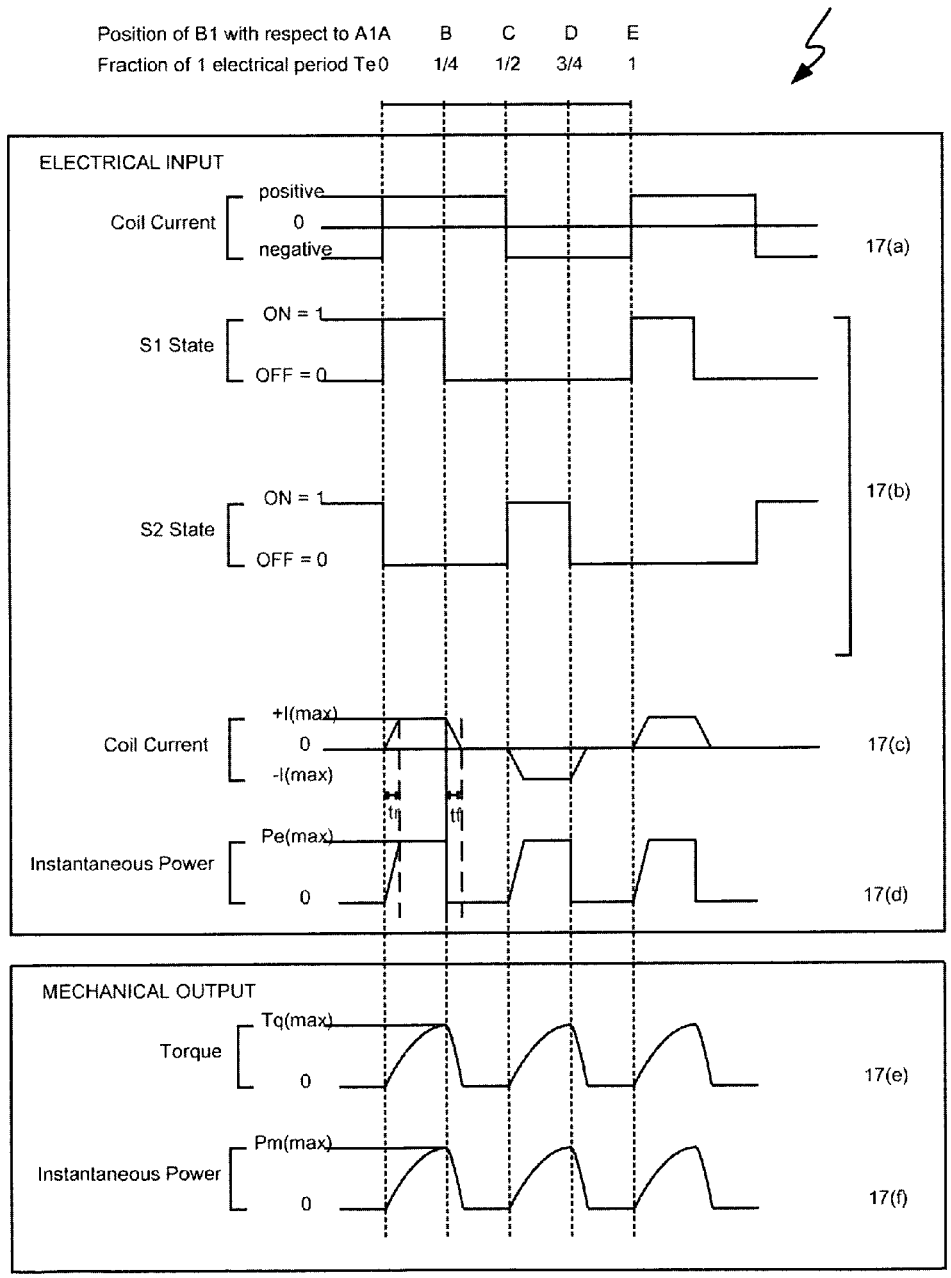
FIG. 17 is a timing diagram for the electric motor driven by the half-bridge controller operating at a low frequency.

The electrical input waveforms and mechanical output waveforms for each coil of an example driven motor, driven by the half-bridge controller 1600 and operating at a low frequency, are related as shown in FIG. 17. FIG. 17(a) shows the waveform of an ideal coil current where it is positive during the first half of Te and is negative (or reverse) during the second half of Te. FIG. 17(b) shows the two switch state waveforms where: switch S1 allows positive current to pass through the coil (S1 is turned ON at Point A, then it is turned OFF at Point B); and switch S2 allows negative current to pass through the coil (S2 is turned ON at Point C, then it is turned OFF at Point D). Each switch is ON for ¼ of each period. FIG. 17(c) shows the coil current waveform where the current is positive between points A and C and is negative between points C to F. FIG. 17(d) shows the instantaneous power of the electrical input (Pe) where power is drawn from the source from Point A to Point B and from Point C to Point D. FIG. 17(e) shows the waveform of the torque developed due to the coil current. The maximum torque is at points B and D. FIG. 17(f) shows the instantaneous power of the mechanical output (Pm).

Figure 18:
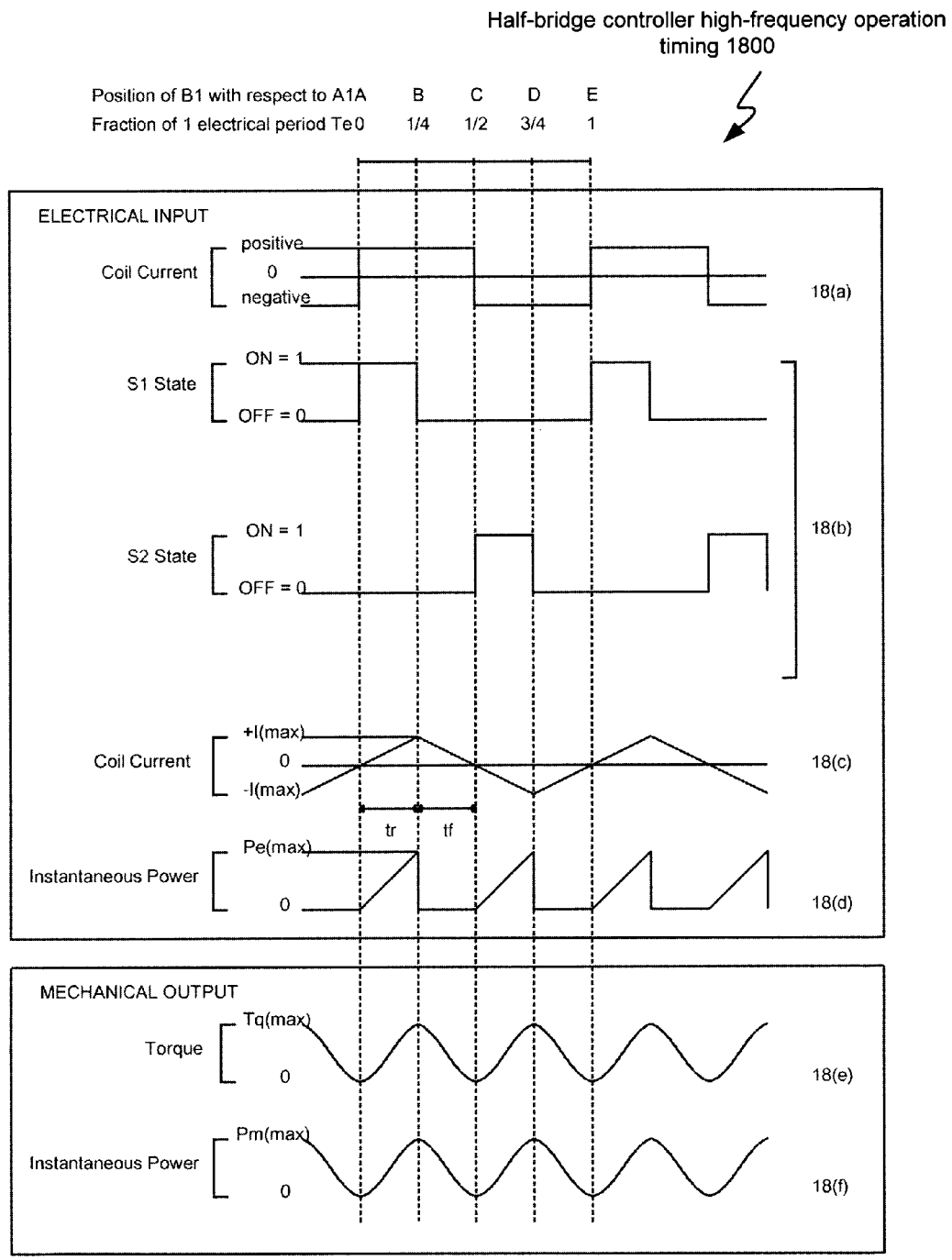
FIG. 18 is a timing diagram for the electric motor driven by the half-bridge controller operating at a high frequency.

The electrical input waveforms and mechanical output waveforms for each coil of an example driven motor, driven by the half-bridge controller 1600 and operating at a high frequency, are related as shown in FIG. 18. The ideal current and switch timings are the same relative to the Te as for the low-frequency operation, as shown in FIGS. 18(a) and 18(b). FIG. 18(c) shows the coil current waveform where the current is positive between Point A and Point C and is negative between Point C and Point E. As the half-bridge controller 1600 is operating at a higher frequency than for the waveforms in FIG. 17, the waveforms in FIG. 18 show the coil current maxima and minima being limited by the rise (tr) and fall (tf) times. For operation at the maximum frequency of the motor, the preferred time to have each switch S1, S2 turned ON is thus about ¼ Te, as shown in FIG. 18. FIG. 18(d) shows the instantaneous power of the electrical input (Pe) where power is drawn from the source from Point A to Point B and from Point C to Point D. FIG. 18(e) shows the waveform of the torque developed due to the coil current. The maximum torque is at points B and D. FIG. 18(f) shows the instantaneous power of the mechanical output (Pm).

Preferably, the controller (such as the switch controller 800, the H-bridge controller 1100, or the half-bridge controller 1500), including its controller circuit, is configured to provide (or "inject") electrical current into each coil individually by including a switch (such as the single switch, the H-bridge switch or the half-bridge switch) for each coil, and by providing the electrical current from a power source (such as a direct current DC source) to the coils in parallel. Powering the coils in parallel rather than in series allows for a greater flow of electrical current in each coil because the electrical resistance of only one coil is experienced by the voltage of the DC source (rather than the electrical resistance of a plurality of coils for coils in series). Higher current in the coils (within performance limits of the coil conductors) produces higher electromagnetic forces in the electric machine.

An electric machine can be a multi-part machine, which includes a plurality of moving magnetic parts, equivalent to a plurality of individual electric machines with shared mechanical parts. For example, a multi-part machine can include: a first electric machine and a second electric machine with the same numbers of poles on their respective parts, sharing a common drive shaft. The poles of the first electric machine are preferably offset from the poles of the second electric machine so as to further reduce magnetic interference forces. For example, having rotors on the same shaft with offset poles, can reduce magnetic interference forces, such as cogging torque, by cancelling out the magnetic interference forces at positions where the force on one of the individual machines is non-zero.

The electric machine can be used in various applications and systems. The electric machine is scalable, i.e., it can be made into various sizes and power ratings. As a rotary motor, the machine can be incorporated into various appliances, power tools, electric cars, etc. As a rotary electric generator it can be used in wind powered electric generators, hydro-electric generators, hybrid cars, etc. As a linear electric motor it can be used, for example, in electromagnetic railways and magnetic trains.

Example

In a computer simulated prototype, the electric machine is in the form of a linear machine where n=4 (similar to a machine as shown in FIG. 5A where n=2). The example machine includes a stator with 5 poles per segment (there are multiple stator-segments). The stator pole width is 35 mm, the stator pole gap width is 35 mm, and the stator gap depth is 35 mm. The stator body comprises soft magnetic material of silicon steel. The linear machine includes a runner with 4 poles per segment (there are two runner-segments in symmetry). The runner pole width is 44 mm, the runner gap width is 44 mm, and the runner gap depth is 44 mm. The magnetic material of the runner is a low carbon steel. The runner includes permanent magnets (PMs) with widths of 35 mm and thicknesses of 10 mm made of neodymium iron boron. The stator poles include coils of copper wire with 100 turns per coil. An air gap of 5 mm separates the stator and runner pole faces. The depth of the machine, i.e., the depth of the parts transverse the direction of motion and into the page in FIG. 5A—which is thus the depth of the stator, the runner and the PMs—is 100 mm.

In simulations of the simulated prototype machine, the peak value of non-zero magnetic interference forces in the direction of motion was about 26 N. The electrical input peak current was about 50 A per coil. The peak value of force produced in the direction of motion was about 510 N per energised coil.

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An electric machine including: a first part, being a stator or rotor/runner, including a first segment with a first number of mutually spaced poles; a second part, being a rotor/runner or stator, including a second segment with a second number of mutually spaced poles arranged to transduce between electrical and mechanical energy by magnetic interaction with the poles of the first segment, the second segment having substantially the same length as the first segment; and permanent magnets in the poles of the first or second parts, wherein the second number differs from the first number by one to substantially reduce the magnetic interference forces in the direction of motion, wherein gap depths in gaps between the poles of each part are sufficiently deep to substantially attenuate magnetic interactions between a body of each part and the poles of the other part, thereby reducing magnetic interference forces between the first part and the second part, and wherein each part is symmetrical in a direction transverse a direction of motion between the first part and the second part and transverse a depth of the parts for substantially balancing magnetic forces acting perpendicular to the direction of motion.

2. An electric machine as claimed in claim 1, wherein the gap depths of the part with the permanent magnets, excluding any permanent magnet (PM) thickness, are at least equal to the PM thickness.

3. An electric machine as claimed in claim 2, wherein the gap depths of the part with the permanent magnets, excluding any PM thickness, are approximately equal to the pole widths of the part.

4. An electric machine as claimed in claim 1, wherein the poles of the first part and the poles of the second part are substantially equally spaced on each part with the gaps between the poles.

5. An electric machine as claimed in claim 1, wherein the gaps between the poles are substantially equal to pole widths of the poles on each part.

6. An electric machine as claimed in claim 1, wherein the poles of the first part include electrical coils, and the poles of the second part include the permanent magnets.

7. An electric machine as claimed in claim 6, wherein the machine is a motor driven by a controller having an electrical period, and each coil receives electrical power from the controller during a first half of the electrical period, via a single switch.

8. An electric machine as claimed in claim 6, wherein the machine is a motor driven by a controller having an electrical period, and each coil receives positive electrical power from the controller during a first half of the electrical period, and negative electrical power during a second half of the electrical period.

9. An electric machine as claimed in claim 8, wherein each coil receives the electrical power via four switches in an H-bridge configuration.

10. An electric machine as claimed in claim 8, wherein each coil receives the electrical power via two switches in a half-bridge configuration.

11. An electric machine as claimed in claim 6, wherein each coil receives the electrical power for approximately a quarter of the electrical period.

12. An electric machine as claimed in claim 6, wherein the machine is a generator that receives a mechanical power input via a rotor or runner, and terminals of each coil provide an electrical power output.

13. An electric machine as claimed in claim 6, wherein a first set of the coils receive electrical power and a second set of the coils provide an electrical power output.

14. An electric machine as claimed in claim 1, wherein the poles of the first part include the permanent magnets, and the poles of the second part include electrical coils.

15. An electric machine as claimed in claim 1, wherein polar faces of the permanent magnets alternate on adjacent poles.

16. An electric machine as claimed in claim 1, wherein the electric machine is a linear machine and the length of each segment is a distance.

17. An electric machine as claimed in claim 1, wherein the electric machine is a rotary machine and the length of each segment is an angle.

18. An electric machine as claimed in claim 17, wherein the first segment forms a first half of the first part of the rotary machine, and the second segment forms a first half of the second part of the rotary machine.

19. An electric machine including: a first electric machine as claimed in claim 17; and a second electric machine as claimed in claim 17, wherein the first electric machine and the second electric machine have the same numbers of poles on their respective parts, and share a common drive shaft, and wherein the poles of the first electric machine are offset from the poles of the second electric machine to reduce magnetic interference forces.

20. An electrical power system, including an electric machine as claimed in claim 1.

* * * * *